US008695043B2

(12) United States Patent
Ponomarev et al.

(10) Patent No.: US 8,695,043 B2
(45) Date of Patent: Apr. 8, 2014

(54) METHOD FOR TRANSMITTING INFORMATION OVER AN INTEGRATED TELECOMMUNICATIONS AND BROADCAST SYSTEM AND INTEGRATED TELECOMMUNICATIONS AND BROADCAST SYSTEM

(75) Inventors: Dmitry Maximovich Ponomarev, Nizhny Novgorod (RU); Vladimir Vladimirovich Krylov, Nizhny Novgorod (RU); Vladimir Ivanovich Parshikov, Nizhny Novgorod (RU)

(73) Assignee: Obschestvo S Ogranichennoi Otvtstvennostyu "Meralabs", Nizhny Novgorod (RU)

( * ) Notice: Subject to any disclaimer, the term of this patent is extended or adjusted under 35 U.S.C. 154(b) by 422 days.

(21) Appl. No.: 12/672,922

(22) PCT Filed: Jul. 28, 2008

(86) PCT No.: PCT/RU2008/000493
§ 371 (c)(1),
(2), (4) Date: Aug. 29, 2011

(87) PCT Pub. No.: WO2009/031935
PCT Pub. Date: Mar. 12, 2009

(65) Prior Publication Data
US 2012/0151534 A1 Jun. 14, 2012

(30) Foreign Application Priority Data

Aug. 10, 2007 (RU) ................................ 2007130679

(51) Int. Cl.
*H04N 7/16* (2011.01)
*H04N 7/173* (2011.01)

(52) U.S. Cl.
USPC ................ 725/62; 725/98; 725/118; 725/148

(58) Field of Classification Search
USPC ..................................... 725/62, 98, 118, 148
See application file for complete search history.

(56) References Cited

U.S. PATENT DOCUMENTS 6,760,303 B1 * 7/2004 Brouwer ........................ 370/229

(Continued)

FOREIGN PATENT DOCUMENTS

RU 2296435 3/2007
WO WO-97/41704 11/1997

OTHER PUBLICATIONS

International Search Report and Written Opinion for PCT/RU2008/000493, dated Dec. 1, 2008.

*Primary Examiner* — Nasser Goodarzi
*Assistant Examiner* — Fred Peng
(74) *Attorney, Agent, or Firm* — Marshall, Gerstein & Borun LLP; Randall G. Rueth

(57) ABSTRACT

The present invention relates to methods and systems for transmitting information over different information networks and in particular to a method for transmitting information in an integrated telecommunications and broadcast system. The method for transmitting information across the integrated telecommunications and broadcast system incorporating a cellular network and a broadcast network with a plurality of broadcast content providers connectable to transmitter/receiver equipment installed at least one base station of the cellular network, consists of broadcast content generation by broadcast content providers, connecting the broadcast content providers to an internal IP network for broadcast program distribution, transfer of the broadcast content from the broadcast content providers by means of the internal IP network via communication links and line transmission equipment of the cellular network, transmission of cellular network information over the communication links and line transmission equipment of the cellular network, generation of a combined information stream of the broadcast content information and information of the cellular network for its transmission to at least one base station of the cellular network, separation of independent streams—the cellular network information stream and the broadcast network information stream from said combined stream, and transmission of the separated independent information streams to the above-mentioned transmitter/receiver equipment for their further transmission over appropriate independent channels to subscribers of the integrated telecommunications and broadcast system, located within the coverage area of the integrated system.

20 Claims, 2 Drawing Sheets

(56) References Cited

U.S. PATENT DOCUMENTS

| | | | |
|---|---|---|---|
| 6,829,482 B2 * | 12/2004 | Rune et al. | 455/442 |
| 7,190,680 B2 | 3/2007 | Lim | |
| 7,283,782 B2 * | 10/2007 | Sinnarajah et al. | 455/3.01 |
| 2003/0054807 A1 * | 3/2003 | Hsu et al. | 455/414 |
| 2003/0086015 A1 | 5/2003 | Korhonen et al. | |
| 2003/0114177 A1 * | 6/2003 | Sinnarajah et al. | 455/515 |
| 2004/0242163 A1 | 12/2004 | Karr et al. | |
| 2006/0013099 A1 | 1/2006 | Weijenbergh et al. | |
| 2006/0130099 A1 * | 6/2006 | Rooyen | 725/62 |
| 2006/0251115 A1 | 11/2006 | Haque et al. | |
| 2006/0270368 A1 * | 11/2006 | Caimi et al. | 455/129 |
| 2008/0255930 A1 * | 10/2008 | Cope et al. | 705/10 |
| 2011/0275310 A1 * | 11/2011 | Lucidarme | 455/3.01 |

* cited by examiner

METHOD FOR TRANSMITTING INFORMATION OVER AN INTEGRATED TELECOMMUNICATIONS AND BROADCAST SYSTEM AND INTEGRATED TELECOMMUNICATIONS AND BROADCAST SYSTEM

FIELD OF THE INVENTION

The present invention relates to methods of and systems for transmitting information via different information networks and in particular to a method for transmitting information across an integrated telecommunications and broadcast system and can be used for delivery of innovative multimedia telecommunication and broadcast service to consumers of various regions in the territory of which modern cellular telecommunication systems are deployed.

STATE OF THE ART

The interest of cellular and broadcast network operators in building hybrid heavy-traffic networks through consolidation of original networks' resources has sharply grown owing to the rapid development of the market of multimedia services delivered to customers by means of the high bit rate broadband digital technology. In doing so the existing broadcast networks are used for high bit rate delivery of broadband data (audio, high-definition video in real time and high volume of data) while cellular telecommunication systems are used both for traditional cellular telecommunications (voice communication, short message delivery (SMS) etc.) and as a feedback return path in on-demand TV implementations.

The interest of researchers in converting cellular telecommunication systems into systems of enhanced functionality and increased capacity grows steadily.

Thus, publication of PCT application WO97/41704 (Nov. 9, 1997) discloses a method of converting a first generation cellular telecommunication system into a second generation cellular telecommunication system that comprises mobile switching offices, base stations and mobile terminals. The method proposed in the application allows an increase of the first generation system capacity through introduction of multi-cell sites at least one base station, and introduction of versatile base station equipment capable of interworking with systems of both generations and allowing shifting the radio resource utilization as desired or necessary from the first type of system to the second type of system by reconfiguring the versatile equipment of the base station.

US application 2006/0130099A (Jun. 15, 2006) discloses a method of and a system for cellular network and integrated broadcast television downlink with intelligent service control without feedback designed for the interoperation of a plurality of networks and comprising cellular networks for processing cellular communication services: including at least one cellular voice service and at least one cellular service for data transfer by a mobile terminal and a broadcast network designed for processing and delivery of at least one VHF/UHF frequency band broadcast service by a mobile terminal.

The cellular networks that are integrated with the broadcast TV downlink are well known cellular systems GPRS, EDGE, UMTS, GSM (enhanced and of third generation (3G)) that employ packet-switched or packet mode transfers on wireless networks.

The cellular communication systems can be used in hybrid network implementations for the delivery of broadcast and multicast services that are also based on the IP datacast (IP DC) technology.

For broadcast service provisioning (the delivery of digital TV, audio content or data) the lines of already deployed broadcast systems of the DTTB (digital television terrestrial broadcasting) standard including its DVB-T (digital video broadcast-terrestrial) and DVB-H (digital video broadcast-handheld) variants as well as of the advanced television standard (ATSC) and integrated services digital broadcast-terrestrial (ISDB-T) standard are used.

The integration of services provided by a cellular network and a digital broadcast network and interoperation of the two independent (each having a complete infrastructure) networks is achieved by means of a control center performing control and information distribution functions in the integrated system.

The limitations of the method of information transfer and integrated system proposed in the above-mentioned application include:

1. The integrated system is built on the basis of two independent networks and involves the requisite availability of a fully developed infrastructure in each of the constituent networks, comprising a complete set of equipment, communication links and permanent structures, which, in case of a broadcast network, are costly (75-120-200 meters high) towers, complex antenna systems and high power (hundreds of kW) transmitters with heavy-duty power supply units.

2. To develop an integrated system proposed in the application, that is to extend the broadcast coverage area and increase the subscriber audience using the service of the broadcast network, it is necessary to build new permanent structures, lay new lines to the facilities (or set up repeater stations) which requires substantial finance and time expenditures.

3. The proposed method of transmitting broadcast content in the integrated system by means of high-location antenna systems is not versatile and does not provide for high quality reception of broadcast content by subscribers in areas where line-of-sight signal propagation is impossible. Such non-line-of-sight signal propagation conditions are typical for rugged topography terrains and cities with tower-block sky lines and lead to significant (up to 35-40 dB) signal attenuation and, therefore, to deterioration of the consumer broadcast reception quality determined by applicable standards.

US application 2006/0251115A1 (Nov. 9, 2006) proposes a broadband multi-service, switching, transmission and distribution architecture for low-cost telecommunications networks. The low-cost broadband multi-service communication network includes intelligent hybrid communication nodes interacting with one another. The hybrid communication nodes have multi-media interfaces and processors that allow the nodes to receive a communication broadcast at one protocol interface, convert the broadcast to other communication protocols, and route it to other communication media.

The limitations of the proposed in the application method of broadband multi-service, switching and information transfer and of the distribution network architecture include:

Limited application because of small coverage area determined by a limited power of transmission devices. The limited power of transmission devices is determined by placing them in a weatherproof container of the module, small size of the module, strict heat dissipation requirements and, as a consequence, demanding thermal conditions observance arrangements for the transmitter module. This is the reason why the main application of a system with low-power transmitters is limited to service provisioning in sub-urban and rural areas at the edge of coverage of already deployed cellular networks where operation of such systems is economically justified.

The limited number of subscribers (9999) serviced by one node and the unavailability of service for subscribers arriving from other areas (lack of roaming), which can also be attributed to a small database capacity, and explained by the proposed architecture and system's miniaturization.

Broadcast content providers being not part of the network.

The reception of the broadcast content is proposed by connecting the network either to the existing terrestrial lines of content providers or to satellite communication links, which involves additional expenditures. In case there are no such lines in the territory of the system's supposed deployment, broadcast content reception arrangements may involve large financial expenditure.

Thus, it is safe to assume that the method of transmission and the network architecture proposed in the application are supplementary to already existing cellular networks with the end of coverage expansion through the use of networking equipment enclosed in a single container and performing minimum functions of modern cellular networks.

The proliferation of entertainment multimedia services for mobile terminals arouses keen interest of broadcast and cellular network operators in delivering high definition television (HDTV) to mobile terminals, is stimulatory to search of new solutions in organizing the interoperation of the existing broadcast and telecommunication systems and promotes exploration of new architectures for hybrid networks.

For example, under the project "Unlimited Mass Market Mobile TV" ALCATEL proposes the use of a hybrid space-terrestrial (satellite) architecture that combines the capabilities of third generation land mobile networks (3G/UMTS) and of S-band space segment (2.25 GHz). To receive satellite-delivered TV programs in the digital video broadcast-handheld (DVB-H) format for their further distribution (transmission) to land mobile terminals, in addition to the existing space broadcast segment, ALCATEL proposes to use the existing third generation base stations (3G/UMTS) ALCATEL NodeB equipped with S-band repeaters and integration of the existing ALCATEL mobile telecom equipment with the equipment of other manufacturers.

So, the existing methods of integrating broadcast and cellular networks suggest either the development of innovative hybrid equipment combining the functionality of both networks and their operation maintenance centers or shared use of already existing independently of one another broadcast and cellular networks.

There is no broadcast infrastructure in the majority of territories serviced by cellular networks, and a deployment of a hybrid system that meets all up-to-date multi-media content delivery requirements may involve significant capital and time expenditure because of the need to build permanent structures (for example, 70-200 m high masts for broadcast antennas, installation of repeaters or communication links laying) to purchase, install and test the equipment which actually means developing a new broadcast infrastructure from scratch.

Therefore, there is a need for a significant broadening of the spectrum of services offered to cellular customers through creation of integrated telecommunications and broadcast systems that exploit such proven strengths of cellular networks as:

High quality of service regardless of local topography and actual subscriber's position in the serviced territory.

Comparatively low cost of coverage area expansion and growth of the network subscriber population achieved through the deployment of new base stations and creation of new cells.

Economic efficiency of providing service to scarcely populated territories and convenience of service rendering and payments for service.

Such problems are completely resolved by using the proposed hereby method of information transmission and integrated telecommunications and broadcast system.

Simultaneously, the broadcast network services (audio, video and data transfer) in the integrated telecommunications and broadcast system may also be delivered in full to new fixed subscribers connected to cellular networks, which leads to a considerable growth of cellular subscriber population and an increase of revenues of telecommunication service and broadcast content providers.

The availability of trunk packet switched networks on the deployed cellular networks and their usage in the integrated telecommunications and broadcast system will allow the transfer of any type of data and provide for transportation of all known types of information (audio, video, data) in a single stream of the integrated telecommunications and broadcast system with their subsequent separation and distribution via base stations and means of broadcasting, thus enabling access of subscribers of the integrated telecommunications and broadcast system to a full range of multi-media communication and broadcast services.

SUMMARY OF THE INVENTION

The objective of the present invention is to provide a method for transmitting information over an integrated telecommunications and broadcast system comprising a cellular network and a broadcast network with a plurality of broadcast content providers connectable to transmitter/receiver equipment deployed at least one base station of the cellular network, comprising the steps of:

generating a broadcast content by broadcast content providers;

connecting the broadcast content providers to an internal IP network for broadcast program distribution;

transmitting the broadcast content of the broadcast content providers by means of the internal IP network via the communication links and line transmission equipment of the cellular network;

transmitting cellular network information via communication links and line transmission equipment of the cellular network;

generating a combined broadcast content information and cellular network information stream for its further transfer to the at least one base station of the cellular network;

separating independent streams—the cellular network information stream and the broadcast network information stream—from said combined information stream; and transferring the separated independent information streams to said transmitter/receiver equipment for their further transmission over appropriate independent channels to subscribers of the integrated telecommunications and broadcast system, located in the coverage area of the integrated system.

In one of the invention embodiments the IP network for distribution of broadcast programs functions as an overlay network on top of the cellular IP network.

In another embodiment of the invention the transmission of said separated independent information streams is performed by means of cellular network signal transmitters, transmitter/receiver unit of said base station and broadcast network signal transmitters that are a part of said transmitter/receiver equipment.

In another embodiment of the invention the broadcast network signal transmitters are terrestrial digital TV broadcast transmitters of the DVB-T and DVB-H standards.

In another embodiment of the invention IP TV broadcast programs are produced by broadcast content providers on requests delivered over the cellular network.

In another embodiment of the invention a separation of the operating frequency band allocated to cellular network signal transmitters and the operating frequency band allocated to broadcast network signal transmitters is provided.

In another embodiment of the invention the transmission of said separated independent information streams is carried out via cellular network signal transmit/receive antennas and broadcast network signal transmit antennas respectively.

In another embodiment of the invention the cellular network signal transmit/receive antennas and the broadcast network signal transmit antennas are located on the same mast of the antenna facility of said base station.

In another embodiment of the invention vertical spacing of the cellular network signal transmit/receive antennas and the broadcast network signal transmit antennas is provided.

In another embodiment of the invention the number of broadcast content providers per every base station is unlimited.

In another embodiment of the invention the generation of a combined stream of broadcast content information and cellular network information is carried out through multiplexing.

In another embodiment of the invention the separation of independent streams—the cellular network information stream and the broadcast network information stream—from said combined information stream is carried out through demultiplexing.

Another objective of the present invention is to provide an integrated telecommunications and broadcast system (103), comprising:

a cellular network (101), including at least one base station (113) and a switch (114), said base station having at least standard equipment (105), transmitter/receiver equipment including at least a cellular network signal transmitter/receiver unit (119), cellular network signal transmit antennas (104), broadcast network signal generation equipment (110), broadcast network signal transmitters (111) and broadcast network signal transmit antennas (112), and a demultiplexer (109); and a broadcast network (102) with a plurality of broadcast content providers (106A,B,C), providing a delivery of said broadcast content to subscribers of the integrated system by connecting the broadcast content providers via a broadcast program distribution internal IP network (107) to said transmitter/receiver equipment;

wherein the broadcast network further including:

a management device (115) connected to said internal IP network for generation and distribution of the broadcast program content and to said switch; and a multiplexer (108) generating a combined information stream of broadcast network information and cellular network information for its transmission to the at least one base station, wherein the multiplexer is connected to said switch and to said demultiplexer which separates independent streams—the broadcast network information stream and cellular network information stream—from said combined stream;

wherein the demultiplexer is connected to said standard equipment and cellular network signal transmitters of said transmitter/receiver unit of the base station for transfer of said cellular network information stream to said cellular network signal transmit/receive antennas for its subsequent transmission via independent channels (121C1, C2) to subscribers of the integrated telecommunications and broadcast system, located in the coverage area of the integrated system, furthermore the demultiplexer is connected to said broadcast network signal generation equipment, which is connected to said broadcast network signal transmitters for transmission of said broadcast network information stream to said broadcast network signal transmit antennas for its subsequent delivery over independent channels (122B1, B2) to subscribers of the integrated telecommunications and broadcast system, located within the coverage area of the integrated system.

In one of the invention embodiments existent deployed cellular networks are used as the cellular network.

In another embodiment of the invention the broadcast program distribution IP network functions as an overlay network on top of the cellular IP network In another embodiment of the invention the broadcast network signal transmitters are terrestrial digital TV broadcast transmitters of the DVB-T and DVB-H standards.

In another embodiment of the invention broadcast content providers design IP TV broadcast programs on requests delivered over the cellular network In another embodiment of the invention the operating frequency band allocated for cellular network signal transmitters and the operating frequency band allocated for broadcast network signal transmitters are separated.

In another embodiment of the invention the cellular network signal transmit/receive antennas and the broadcast network signal transmit antennas are co-located on the same antenna mast of the antenna facility of said base station.

In another embodiment of the invention the cellular network signal transmit/receive antennas and the broadcast network signal transmit antennas are vertically spaced.

In another embodiment of the invention the number of broadcast content providers per every base station is unlimited.

BRIEF DESCRIPTION OF THE FIGURES

These and other aspects of the invention will become more readily apparent when reference is made to the following detailed description of a preferred invention embodiment that should be taken in conjunction with the accompanying drawings where.

DETAILED DESCRIPTION OF THE PREFERRED EMBODIMENT

Architecture of the Integrated Telecommunications and Broadcast System and a Method for Transmitting Information Over the Integrated Telecommunications and Broadcast System In what follows the invention is illustrated by its particular embodiment with reference to the above mentioned drawings.

Figure 1:
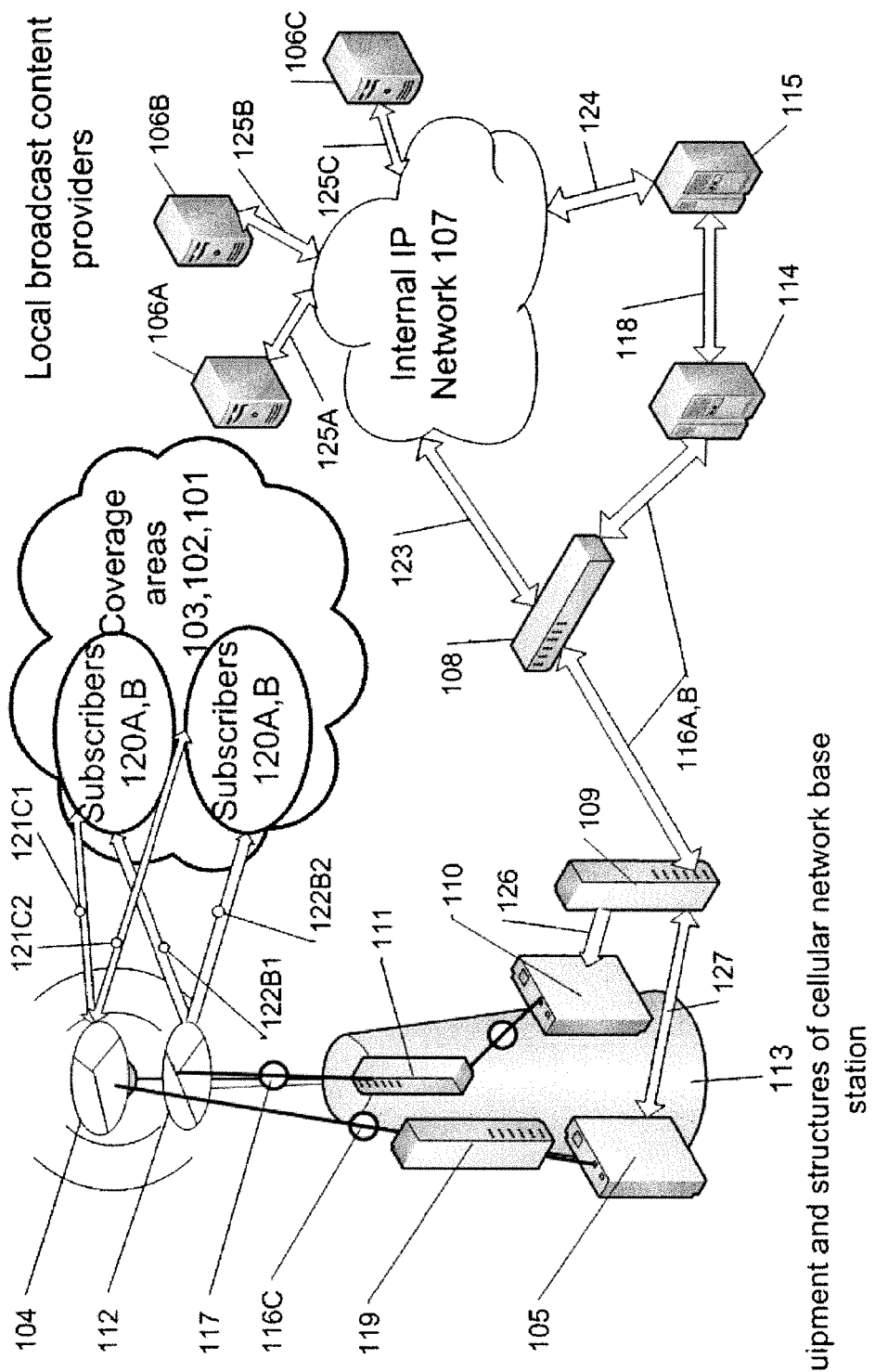
FIG. 1 illustrates the proposed method of information transmission over an integrated telecommunications and broadcast system

The integrated telecommunications and broadcast system (103) (FIG. 1) incorporates the complete infrastructure of a cellular telecommunications system and additional equipment performing broadcast functions.

The cellular network (101), the coverage area of which is formed by radio signals produced by the network, comprises at least one base station (113) including at least standard equipment (105), transmitter/receiver equipment, comprising at least a cellular network signal transmitter/receiver unit (119), cellular network signal transmit/receive antennas (104), broadcast network signal generation equipment (110), broadcast network signal transmitters (111) and broadcast network signal transmit antennas (112) and a demultiplexer (109); a switch (114) and telecommunication equipment and lines (116A,B) used for broadcasting and cellular telecommunications. The switch (114) functions as a standard cellular switch during interaction with cellular network subscribers.

Broadcasting and the broadcast signal coverage area of the integrated telecommunications and broadcast system (103) are achieved through installation at the cellular network base station of additional transmit antennas (112), a transmitter (111) in the appropriate frequency band, broadcast network signal generation equipment (110) and a demultiplexer (109) which is a bidirectional device for information separation and transmission.

The broadcast network (102) additionally comprises a management device (115) connected to the internal IP network for generation and distribution of the broadcast program content and to the switch (114), and a multiplexer (108)

Connection of local broadcast content providers (106A, 106B, 106C) to the broadcast equipment located at the base station is done by means of an internal IP network (107) connected to cellular network communication links and line transmission equipment (116B) of the bidirectional communication link (123) and the multiplexer (108). The multiplexer (108) produces a combined information stream of the broadcast network information and cellular network information for its transmission to at least one base station of the integrated telecommunications and broadcast network The demultiplexer (109) separates independent streams— the cellular network information stream and the broadcast network information stream from the combined stream for their transmission via appropriate independent communication channels to subscribers of the integrated telecommunications and broadcast system who are located in the coverage area of the integrated system.

The broadcast network management device (115) performs standard network administration functions to enable its normal operation.

The architecture of an integrated telecommunications and broadcast system, proposed according to the invention, additionally allows a realization of IP television with on-demand program delivery (On-Demand IPTV) where feedback are the requests coming from cellular network subscribers and processed by the cellular network switch (114) and broadcast network management device (115). Information exchange between the switch (114) and a broadcast network management device (115) is enabled with the help of the communication link (118).

Thus the integrated telecommunications and broadcast network incorporates the complete infrastructure of the cellular network and includes an additional broadcast component. The cellular network equipment and communication links (116A,B), the cellular network switch (114), base stations (113) and antenna facilities thereof are shared by the components of the integrated telecommunications and broadcast system.

Generation and Transmission of Digital Information Streams

Broadcast content is generated by local broadcast content providers (106A, 106B, 106C) in the IP format and is transferred to the multiplexer (108) over the internal IP network and the bi-directional link (123).

The multiplexer (108) combines the information from the switch (114) with the broadcast content and generates a combined stream, which via the communication links and line transmission equipment (116A, B) is transmitted to the demultiplexer (109), installed at the base station (113).

The demultiplexer (109) separates the broadcast network information stream (broadcast content) and cellular network information stream from the combined stream and transfers them to the appropriate equipment of the base station: the broadcast network information stream—to the broadcast network signal generation equipment (110) and transmitters (111) in the appropriate frequency band and, further, over the feeder lines (117) to the transmit antennas (112), with subsequent emission of radio signals to cover the coverage area of the integrated telecommunications and broadcast system; and the cellular network information stream—to the standard equipment (105) of the base station, cellular network signal transmitter/receiver unit (119) and further via the feeder lines (116C) to the cellular network signal transmit/receive antennas (104), with subsequent emission and transmission of radio signals over set up independent wireless channels (121C1, C2 and 122B1, B2) to cover the coverage area (101) of the cellular network and the integrated telecommunications and broadcast system (103).

In on-demand IPTV implementations information about a particular request for content is received from a mobile terminal over cellular network links and is transmitted further via antennas (104), transmitter/receiver unit (119) of the base station, standard equipment (105) of the cellular network base station, bi-directional communication link (127), demultiplexer (109), communication links and line transmission equipment (116), switch (114) and communication link (118) to the management device (115) for managing the broadcast network.

The broadcast network management device (115) by means of the internal IP network generates the requested set of programs from the plurality of programs by local broadcast content providers (106A, 106B, 106C). The generated on-demand content is transmitted from the content source to the base station of the cellular network (along the above-mentioned content delivery path), processed by the broadcast component of the base station equipment and is delivered to subscribers of the integrated telecommunications and broadcast system.

During operation of the cellular network two-way information exchange takes place over the 'mobile subscriber-base station-mobile subscriber' communication link of the cellular network and over the 'base station-switch-base station' internal communication links of the network.

Information transfer over the cellular network from the switch (114) to the standard equipment (105) of the cellular network base station is carried out via the shared communication links and line transmission equipment (116A), via multiplexer (108) and further in form of a combined information stream via the shared communication links and line transmission equipment (116B) to demultiplexer (109).

The demultiplexer (109) separates the cellular network information stream from the combined stream at the same time performing standard stream splitting functions and transfers it over the bi-directional communication link (127) to the appropriate standard equipment (105) of the cellular network base station and, further, via the transmitter/receiver unit (119) of the base station and feeder lines (116C) to transmit/receive antennas (104), with subsequent transmission of the cellular network information to cellular subscribers over wireless channels.

Information from cellular network subscribers, received by receive antennas (104) is fed through feeder lines (116C) to receiver units (119) and standard equipment (105) of the cellular network base station and is further transmitted from the base station back to the switch (114) of the cellular network over the bi-directional communication link (127), the demultiplexer (109), functioning now as a bidirectional (forward way—from switch to the base station, reverse way—from the base station to the switch) device for transfer of information received from cellular network subscribers, and, further, over the communication links and line transmission equipment (116B) via the multiplexer (108), communication links and line transmission equipment (116A) of the cellular network to the switch (114).

Block Diagram of the Integrated Telecommunications and Broadcast System

Figure 2:
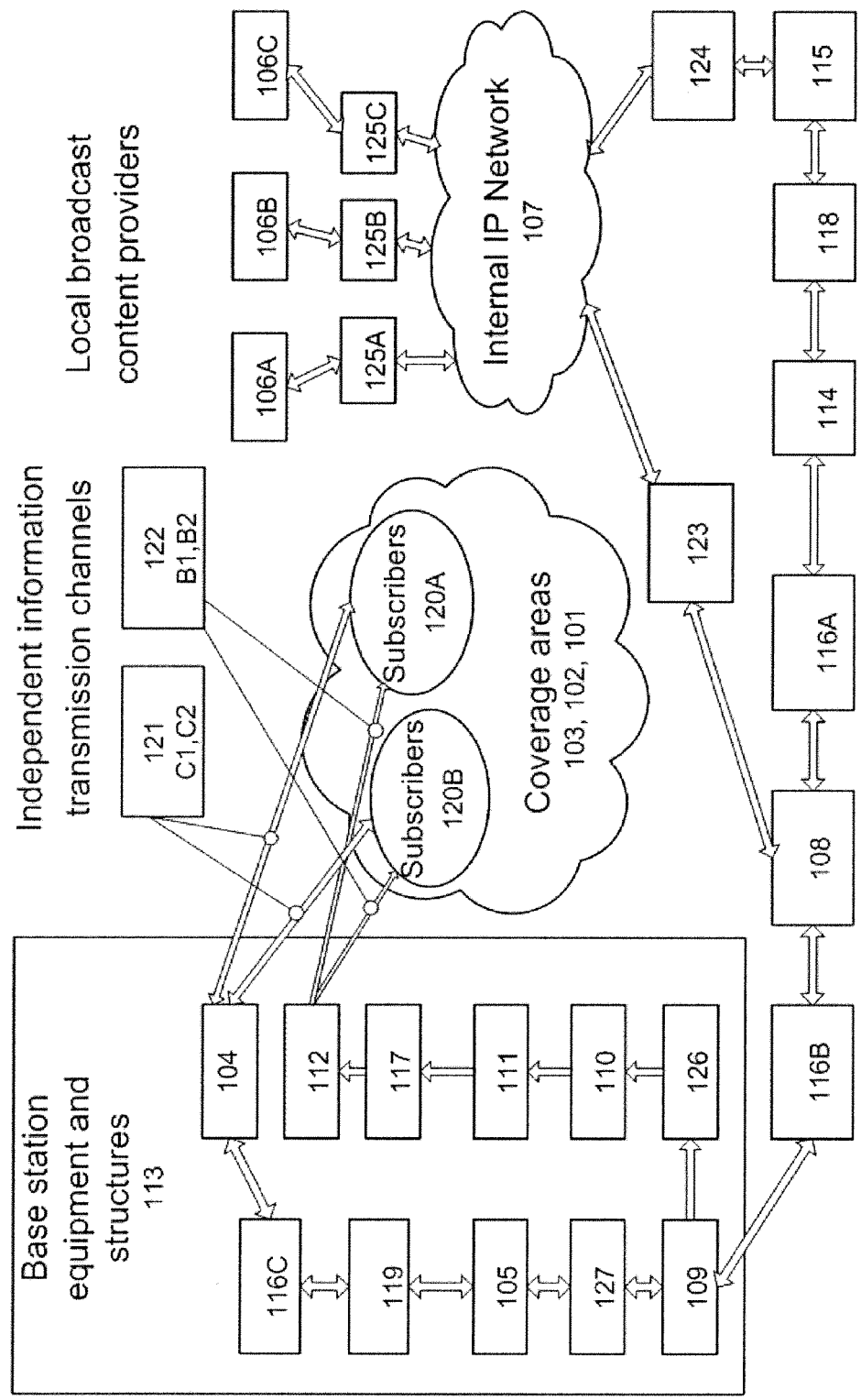
FIG. 2 illustrates the configuration and interaction of principal components of the integrated telecommunications and broadcast system

FIG. 2 shows a block diagram of the integrated telecommunications and broadcast system. The functions, performed by each constituent unit of the integrated telecommunications and broadcast system, and their interrelations are as follows.

The integrated telecommunications and broadcast system (103), comprising a cellular network (101), a broadcast network (102) with a plurality of broadcast content providers (106A, B, C), enables the delivery of said broadcast content to subscribers of the integrated system by linking said broadcast content providers by means of bi-directional communication links (125A, B,C) over the internal IP network (107) and bi-directional communication link (123) to the multiplexer (108) and then to the transmitter/receiver equipment, installed at the base station (113) of the cellular network; and incorporates a broadcast network management device (115), connected to the internal IP network by means of a bi-directional communication link (124) for generation and distribution of the broadcast program content.

The broadcast network management device (115) by means of a bi-directional communication link (118) is connected to the cellular network switch (114); which is further connected via the bi-directional communication link and line transmission equipment (116A) of the cellular network to the multiplexer (108), connected to the internal IP network (107) via a bi-directional communication link (123) and generating a combined information stream of broadcast network information (broadcast content) and cellular network information.

The multiplexer (108) via the bi-directional communication link and line transmission equipment (116B) of the cellular network is connected to the demultiplexer (109) located at the cellular network base station (113) and having one communication link for receiving the combined information stream and two communication links for separate transfer of two independent information streams, separated from the combined stream.

The demultiplexer (109) separates from said combined information stream the cellular network information stream and the broadcast network information stream and sets up a connection to the standard equipment (105) of the cellular network base station via the bi-directional communication link (127) and further to the transmitter/receiver unit (119) of the cellular network base station.

The transfer of the independent cellular network information stream, separated from the combined stream, is effected via cellular network signal transmission feeder lines (116C) connected to the transmit/receive antennas (104) of the cellular network base station with subsequent transmission of said information via independent channels (121C1, C2) to subscribers of the integrated network, located in the coverage area of the integrated telecommunications and broadcast system (103).

For the transfer of the independent broadcast network information stream, the other output of the demultiplexer (109) is connected via the communication link (126) to the broadcast network signal generation equipment (110), installed at the cellular network base station, and further to the broadcast network signal transmitters (111).

The broadcast network signal transmitters (111) are connected with the broadcast network transmit antennas (112) via the broadcast network signal transmission feeder line (117) for transmission of broadcast network information over independent channels (122B1, B2) to subscribers (120A, B) of the integrated system, located within the coverage area of the integrated telecommunications and broadcast system (103).

PHYSICAL EMBODIMENT AND INDUSTRIAL APPLICABILITY

The embodiment feasibility of the method of and system for information transmission in the integrated telecommunications and broadcast system is confirmed by results of an inquiry into and field tests of the compatibility of cellular broadcast systems and DVT-T and DVB-H digital broadcast systems deployed in the same geographical region.

The results of the field tests carried out in England, Germany, France have proved completely the theoretical conclusion about the feasibility of joint operation of the above-mentioned systems without mutual interference and loss in the quality of service delivered to subscribers of each system.

The integrated telecommunications and broadcast system proposed in the present invention, wherein the transmission equipment of the broadcast network is installed at the cellular network base station and transmit antennas of the broadcast network are co-located next to the cellular network transmit antennas on the same mast, allows normal operation of the integrated system equipment without mutual interference between the equipment of constituents.

This is achieved on the one hand through separation of the operating frequency band allocated to the cellular network signal transmitters and the operating frequency band allocated to broadcast network signal transmitters and appropriate frequency allocation planning for the integrated network; and on the other hand through vertical spacing of the broadcast network signal transmit antennas and cellular network signal transmit/receive antennas, mounted on the same antenna mast of the base station antenna facility.

As is known, the co-location of broadband antennas with broad radiation pattern on the same mast allowing for a 30 cm and greater vertical separation provides for more than a 50 dB antenna isolation thus precluding virtually any interference of transmitters of the broadcast part of the system with transmitter/receiver units of the cellular network even when the systems operate on the same VHF/UHF band frequency.

Moreover, the achieved antenna isolation values prove independent of the antennas' vertical beamwidth and their tilt relative to the horizon and each other; which makes it possible to use as base station antennas of the integrated telecommunications and broadcast system standard antennas of cellular network base stations, for example, sector antennas, phased-array antennas, adaptive antennas with no restrictions to their characteristics.

With a significant separation of the operating frequency bands (for example, 800 MHz and 1900 MHz) the isolation value for antennas placed at 30 cm or further apart may amount to 60-70 dB.

According to the proposed invention it is suggested to use the DVB-H and DVB-T terrestrial digital TV broadcast standards for broadcasting high-definition digital TV to mobile and fixed terminals of the integrated telecommunications and broadcast system.

The use of the IP Datacast-over-DVB-H format in the broadcast network enables the delivery of digital content of any type from the source to a subscriber with the basic IP capability and allows optimization of content handling and processing by a mobile terminal with a limited computing power and battery endurance.

An integrated telecommunications and broadcast system is implemented on the basis of a complete set of commercially available cellular network equipment or on the basis of already deployed cellular networks by installation of standard broadcast network management equipment and DVB-T/DVB-H transmission equipment for terrestrial digital TV broadcasting at existent base stations.

By way of example, the following equipment may be used in an integrated telecommunications and broadcast network:
Transmitters Audemat—Aztec 25
Transmitters DVB-T/H Harris
DVB-H IPE-10 Encapsulator UDcast (Harris)
DVB-H IRE Manager UDcast (Harris)
PT 5781 Single board OEM DVB-T/H Modulator ProTelevision Technologies To ensure the necessary broadcasting coverage for the broadcast network of the integrated telecommunications and broadcast system coinciding with the coverage area of the cellular network, the transmission power of the broadcast network transmitter should be from 10 to 50 W. The actual transmission power value is determined by the cell radius (size of the coverage area); positioning of antennas at the cellular network base station; topography of the territory where the cellular network is deployed (city, suburban or rural area), which guarantees a 100% probability of area coverage by the broadcast signal of the necessary field strength as defined by applicable standards.

The attainability of the necessary signal strength through the use of transmitters of the above-mentioned transmission power is confirmed by numerous published reports of broadcast system tests with broadcast signal strength measurements done at DVB-H and DVB-T signal pickup points.

The cellular architecture of the integrated telecommunications and broadcast system, proposed in the present invention, allows broadcast program generation for both an individual cell and the entire system.

In addition, the proposed architecture allows enlisting local providers of broadcast content for making broadcast programs available in a single designated area and allows broadcast programs designed for specific subscriber audiences.

All this enables building a flexible vehicle of delivering broadcast content to subscribers of the integrated telecommunications and broadcast system in locations where cellular networks are already deployed and functioning while broadcast networks are either unavailable or the broadcasting service quality fails to conform to modern requirements.

To receive broadcast content it is possible to use mobile terminals with the DVB-H signal reception functionality, fixed terminals with the DVB-T signal reception functionality and analog TV sets upgraded by adding an adapter capable of receiving digital TV of the DVB-T format.

By this means the present invention may be used to render new types of multimedia telecommunication and broadcast services to customers of various regions where modern cellular networks are deployed.

While the present invention has been described with reference to a specific preferred embodiment, it will be apparent to those skilled in the art that the invention is not intended to be limited to the particular embodiment disclosed and illustrated herein. Numerous applicable modifications of the described invention will readily occur to persons skilled in the art without departing from the essence and scope of the present invention determined by the appended claims and their equivalents.

The invention claimed is:

1. A method for transmitting information over an integrated telecommunications and broadcast system comprising a cellular network and a broadcast network with a plurality of broadcast content providers connectable to transmitter/receiver equipment deployed at at least one base station of the cellular network, comprising the steps of:
generating a broadcast content by broadcast content providers;
connecting the broadcast content providers to an internal IP network for broadcast program distribution;
transmitting the broadcast content of the broadcast content providers by means of the internal IP network via the communication links and line transmission equipment of the cellular network;
transmitting cellular network information via communication links and line transmission equipment of the cellular network;
generating a combined broadcast content information and cellular network information stream for its further transfer to the at least one base station of the cellular network;
separating independent streams—the cellular network information stream and the broadcast network information stream—from said combined information stream; and
transferring the separated independent information streams to said transmitter/receiver equipment for their further transmission over appropriate independent channels to subscribers of the integrated telecommunications and broadcast system, located in the coverage area of the integrated system;
wherein the transmission of said separated independent information streams is performed by means of cellular network signal transmitters, transmitter/receiver unit of said base station and broadcast network signal transmitters that are a part of said transmitter/receiver equipment.

2. The method according to claim 1, wherein the IP network for distribution of broadcast programs functions as an overlay network on top of the cellular IP network.

3. The method according to claim 1, wherein the broadcast network signal transmitters are terrestrial digital TV broadcast transmitters of the DVB-T and DVB-H standards.

4. The method according to claim 3, wherein IPTV broadcast programs are produced by broadcast content providers on requests delivered over the cellular network.

5. The method according to claim 1, wherein a separation of the operating frequency band allocated to cellular network signal transmitters and the operating frequency band allocated to broadcast network signal transmitters is provided.

6. The method according to claim 1, wherein the transmission of said separated independent information streams is carried out via cellular network signal transmit/receive antennas and broadcast network signal transmit antennas, respectively.

7. The method according to claim 6, wherein the cellular network signal transmit/receive antennas and the broadcast network signal transmit antennas are located on the same mast of the antenna facility of said base station.

8. The method according to claim 7, wherein vertical spacing of the cellular network signal transmit/receive antennas and the broadcast network signal transmit antennas is provided.

9. The method according to claim 1, wherein the number of the broadcast content providers per each base station is unlimited.

10. The method according to claim 1, wherein the generation of a combined stream of broadcast content information and cellular network information is carried out through multiplexing.

11. The method according to claim 1, wherein the separation of independent streams—the cellular network information stream and the broadcast network information stream from said combined information stream is carried out through demultiplexing.

12. An integrated telecommunications and broadcast system (103), comprising:
a cellular network (101), including at least one base station (113) and a switch (114), said base station having at least standard equipment (105), transmitter/receiver equipment including at least a cellular network signal transmitter/receiver unit (119), cellular network signal transmit antennas (104), broadcast network signal generation equipment (110), broadcast network signal transmitters (111) and broadcast network signal transmit antennas (112), and a demultiplexer (109); and
a broadcast network (102) with a plurality of broadcast content providers (106A,B,C), providing a delivery of said broadcast content to subscribers of the integrated system by connecting the broadcast content providers via a broadcast program distribution internal IP network (107) to said transmitter/receiver equipment;
wherein the broadcast network further including:
a management device (115) connected to said internal IP network for generation and distribution of the broadcast program content and to said switch; and
a multiplexer (108) generating a combined information stream of broadcast network information and cellular network information for its transmission to the at least one base station, wherein the multiplexer is connected to said switch and to said demultiplexer which separates independent streams—the broadcast network information stream and cellular network information stream—from said combined stream;
wherein the demultiplexer is connected to said standard equipment and cellular network signal transmitters of said transmitter/receiver unit of the base station for transfer of said cellular network information stream to said cellular network signal transmit/receive antennas for its subsequent transmission via independent channels (121C1, C2) to subscribers of the integrated telecommunications and broadcast system, located in the coverage area of the integrated system, furthermore the demultiplexer is connected to said broadcast network signal generation equipment, which is connected to said broadcast network signal transmitters for transmission of said broadcast network information stream to said broadcast network signal transmit antennas for its subsequent delivery over independent channels (122B1, B2) to subscribers of the integrated telecommunications and broadcast system, located within the coverage area of the integrated system.

13. The integrated telecommunications and broadcast system according to claim 12, wherein existent deployed cellular networks are used as the cellular network.

14. The integrated telecommunications and broadcast network according to claim 12, wherein the broadcast program distribution IP network functions as an overlay network on top of the cellular IP network.

15. The integrated telecommunications and broadcast network according to claim 12, wherein the broadcast network signal transmitters are terrestrial digital TV broadcast transmitters of the DVB-T and DVB-H standards.

16. The integrated telecommunications and broadcast system according to claim 15, wherein the broadcast content providers design IP TV broadcast programs on requests delivered over the cellular network.

17. The integrated telecommunications and broadcast system according to claim 12, wherein the operating frequency band allocated for cellular network signal transmitters and the operating frequency band allocated for broadcast network signal transmitters are separated.

18. The integrated telecommunications and broadcast system according to claim 12, wherein cellular network signal transmit/receive antennas and broadcast network signal transmit antennas are co-located on the same antenna mast of the antenna facility of said base station.

19. The integrated telecommunications and broadcast system according to claim 18, wherein the cellular network signal transmit/receive antennas and the broadcast network signal transmit antennas are vertically spaced.

20. The integrated telecommunications and broadcast system according to claim 12, wherein the number of the broadcast content providers per each base station is unlimited.

\* \* \* \* \*

UNITED STATES PATENT AND TRADEMARK OFFICE
CERTIFICATE OF CORRECTION

PATENT NO. : 8,695,043 B2  
APPLICATION NO. : 12/672922  
DATED : April 8, 2014  
INVENTOR(S) : Ponomarev et al.

Page 1 of 1

It is certified that error appears in the above-identified patent and that said Letters Patent is hereby corrected as shown below:

On the Title Page, Item [73] under "Assignee", in Column 1, Line 13,
delete "Otvtstvennostyu" and insert
-- Otvetstvennostyu --, therefor.

Signed and Sealed this
Fourth Day of November, 2014

Michelle K. Lee
*Deputy Director of the United States Patent and Trademark Office*